(No Model.)

W. B. PAGE.
GLOVE FASTENER.

No. 586,928. Patented July 20, 1897.

Witnesses:
A. D. Harrison.
P. W. Pezzetti.

Inventor:
W. B. Page
by Knight Brown & Quinby
Attys.

THE NORRIS PETERS CO., PHOTO-LITHO., WASHINGTON, D. C.

UNITED STATES PATENT OFFICE.

WARREN B. PAGE, OF NEWTON, MASSACHUSETTS, ASSIGNOR OF ONE-THIRD TO WILLIAM B. DRAPER, OF MALDEN, MASSACHUSETTS.

GLOVE-FASTENER.

SPECIFICATION forming part of Letters Patent No. 586,928, dated July 20, 1897.

Application filed January 26, 1897. Serial No. 620,673. (No model.)

*To all whom it may concern:*

Be it known that I, WARREN B. PAGE, of Newton, in the county of Middlesex and State of Massachusetts, have invented certain new and useful Improvements in Glove-Fasteners, of which the following is a specification.

This invention relates to fastening devices for gloves and other like articles, comprising a socket member to be fastened on one flap and a stud member on the other flap adapted to enter the socket.

The invention has for its object to provide a fastening device of the character above mentioned the members of which shall be adapted to be firmly and securely interlocked and shall be capable of being made of the minimum depth, so that when they are interlocked the space which they collectively occupy shall be reduced to the minimum.

The invention consists in the improvements which I will now proceed to describe and claim.

Figure 1:
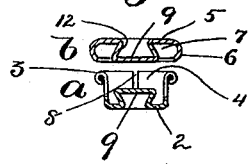
Figure 3:
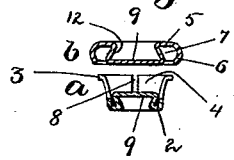
Figure 2:
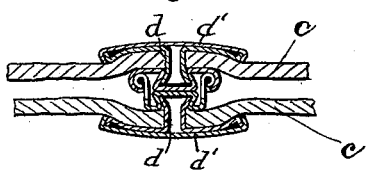
Figure 4:
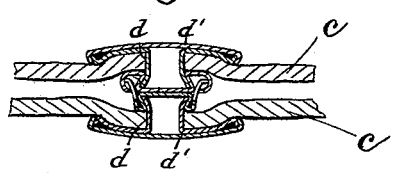
Figure 5:
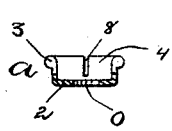
Figure 6:
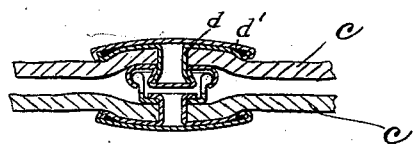

Of the accompanying drawings, forming a part of this specification, Figure 1 represents in separate sectional views the members of my improved fastening device. Fig. 2 represents a view similar to Fig. 1, showing the said members secured to the flaps of a glove and interlocked. Figs. 3 and 4 represent views similar to Figs. 1 and 2, showing a construction whereby the marginal portion of the stud member is expanded by the socket member when the members are connected. Fig. 5 represents a sectional view showing a slightly-modified form of fastening device. Fig. 6 represents a sectional view of a complete fastener, including the member shown in Fig. 5.

The same letters and numerals of reference indicate the same parts in all the figures.

In the drawings, *a* represents the stud member, and *b* the socket member, of my improved fastening device. Each of said members is dome-shaped and includes a crown portion or cap and a marginal portion projecting from said crown and surrounding a recess or cavity at one side of the crown. 2 represents the crown portion of the stud member, and 3 the marginal portion, 4 being the cavity surrounded by the marginal portion.

5 represents the crown portion of the socket member, 6 the marginal portion, and 7 the cavity surrounded by the marginal portion. The marginal portion of the stud is made resilient by means of one or more slots 8, cut from the outer edge partly to the crown, said marginal portion being preferably made additionally resilient and also strengthened by being rolled, as shown in Figs. 1 and 2. The marginal portion of the socket member is continuous or inelastic and practically rigid and is contracted at its outer portion, forming a contracted mouth adapted to interlock with the marginal portion of the stud member when the two members are connected, as shown in Fig. 2.

In the construction shown in Figs. 1 and 2 the engagement of the two members is effected by the resilience of the marginal portion of the stud member, said member being normally of greater diameter than the contracted mouth of the socket member, so that when forced into said mouth the marginal portion of the stud member will be compressed or contracted until it has passed through the mouth and will then normally expand and interlock yieldingly with the marginal portion of the socket member, as shown in Fig. 2.

It will be seen that the two dome-shaped members when connected constitute a very compact fastening, the form of each being such that it can be made of the minimum depth—that is to say, the resilient margin of the stud member can be accommodated by an extremely shallow socket member, much less depth of socket being required than would be the case if the stud member were of the usual form having a closed outer end or crown.

The members may be secured to the flaps *c c* of a glove or other article by any suitable means, preferably by fastening devices each comprising a tubular shank or eyelet *d* and a head *d'*, formed thereon, the outer ends of the shanks *d* being engaged with the fastening members by being spread in hollow bosses 9 9, forming parts of the crowns of said members, each boss having a central head adapted to spread the end of the tubular shank when the latter is forced into the boss and a beveled inner wall 12, of dovetail form, adapted to interlock the spread portion of the shank. I prefer to make the boss 9 on the socket member of sufficient height to enable it to act as a guide for the marginal portion of the stud member, enabling said portion to be readily inserted in the mouth of the marginal portion of the socket member.

It will be seen by reference to Fig. 2 that the dome shape of the stud member enables it to receive the boss of the socket member, so that the projection of said boss does not necessarily increase the thickness of the fastening device.

In Figs. 3 and 4 I show a construction whereby the boss 9 of the socket member is caused to expand the marginal portion of the stud member when the two members are connected, the marginal portion of the stud member being thus forced outwardly or expanded into engagement with the marginal portion of the socket member.

In Figs. 5 and 6 I show the crown of the stud member provided with an orifice $o$, which receives the end of the tubular shank $d$, the latter being spread upon the inner surface of the crown by any suitable means. This construction makes the fastening device more compact than the construction shown in Figs. 1, 2, 3, and 4.

I claim—

1. A fastening device of the character specified, comprising two dome-shaped members, one being a socket and the other a stud, each consisting of a crown portion having provisions for attachment to a glove or other article, and a marginal portion projecting from the crown portion, the marginal portion of the socket member being inelastic and provided with a contracted mouth, while the marginal portion of the stud member is resilient and adapted to enter the said mouth and to engage the marginal portion of the socket member within said mouth.

2. In a fastening device of the character specified, a dome-shaped socket member consisting of a crown portion having a boss or projection, and an inelastic marginal portion surrounding said boss and separated therefrom by an annular space adapted to receive the marginal portion of a dome-shaped stud member.

3. In a fastening device of the character specified, a dome-shaped member having a marginal portion formed for engagement with a complemental fastening member, and a crown portion provided with a boss formed internally to spread and engage an eyelet.

In testimony whereof I have signed my name to this specification, in the presence of two subscribing witnesses, this 7th day of January, A. D. 1897.

WARREN B. PAGE.

Witnesses:
C. F. BROWN,
A. D. HARRISON.